(12) United States Patent
Akutsu

(10) Patent No.: US 12,152,961 B2
(45) Date of Patent: Nov. 26, 2024

(54) VEHICLE VIBRATION DEVICE

(71) Applicant: HONDA MOTOR CO., LTD., Tokyo (JP)

(72) Inventor: Susumu Akutsu, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 264 days.

(21) Appl. No.: 17/820,566

(22) Filed: Aug. 18, 2022

(65) Prior Publication Data

US 2023/0054158 A1 Feb. 23, 2023

(30) Foreign Application Priority Data

Aug. 20, 2021 (JP) .................................. 2021-135207

(51) Int. Cl.
*G01M 17/007* (2006.01)
*G01M 7/02* (2006.01)

(52) U.S. Cl.
CPC ............ *G01M 17/007* (2013.01); *G01M 7/02* (2013.01)

(58) Field of Classification Search
CPC .......................... G01M 7/02; G01M 17/00–06
See application file for complete search history.

(56) References Cited

FOREIGN PATENT DOCUMENTS

| JP | 2007147394 A | * | 6/2007 | .......... G01M 17/007 |
| JP | 2017009545 A | * | 7/2017 | .......... G01M 17/007 |
| JP | 2021043094 A |   | 3/2021 | |
| WO | 2020218251 A1 |   | 10/2020 | |

OTHER PUBLICATIONS

Machine Translation of JP-2007147394-A (Year: 2007).*
Machine Translation of JP-2017009545-A (Year: 2017).*

\* cited by examiner

*Primary Examiner* — Nguyen Q. Ha
(74) *Attorney, Agent, or Firm* — CKC & Partners Co., LLC

(57) ABSTRACT

A vehicle vibration device including: a variable mechanism which makes orientation of a front shaft variable in order to vibrate wheels of a vehicle back and forth in a vertical direction as well in a left/right direction by pinching in a front/rear direction each wheel of the vehicle by the front shaft and a rear shaft which extend in a left/right direction, and which makes the front shaft to move back and forth in a horizontal direction, wherein the variable mechanism includes left and right movement mechanisms which are respectively connected to both left and right ends of the front shaft and are capable of moving both the left and right ends back and forth in the horizontal direction, thereby capable of causing the orientation of the front shaft to vary by making movement amounts by the left and right movement mechanisms to differ, thereby also capable of vibrating the wheels back and forth in the vertical direction as well as in the left/right direction.

8 Claims, 16 Drawing Sheets

FIG. 13
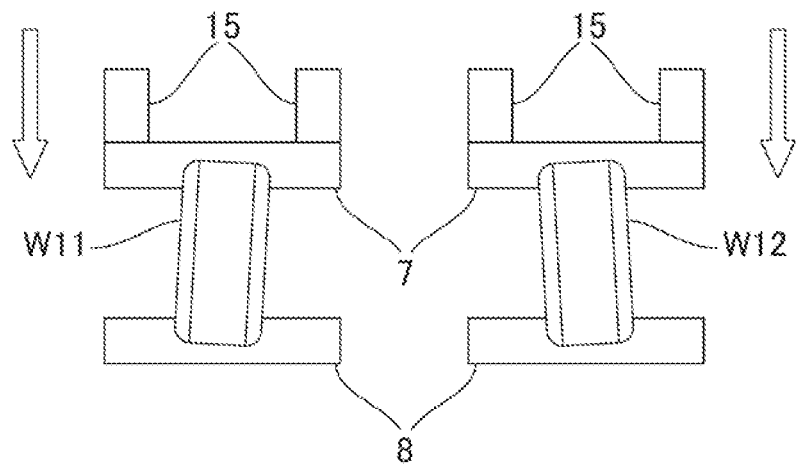
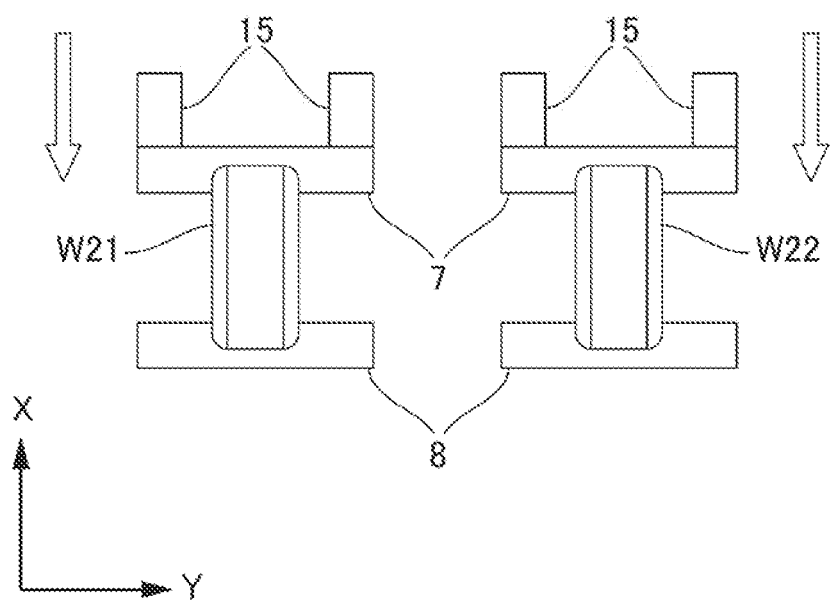

FIG. 14
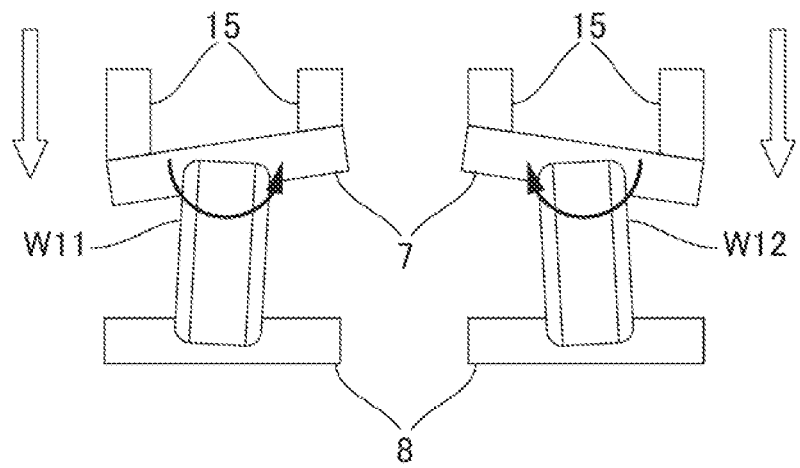
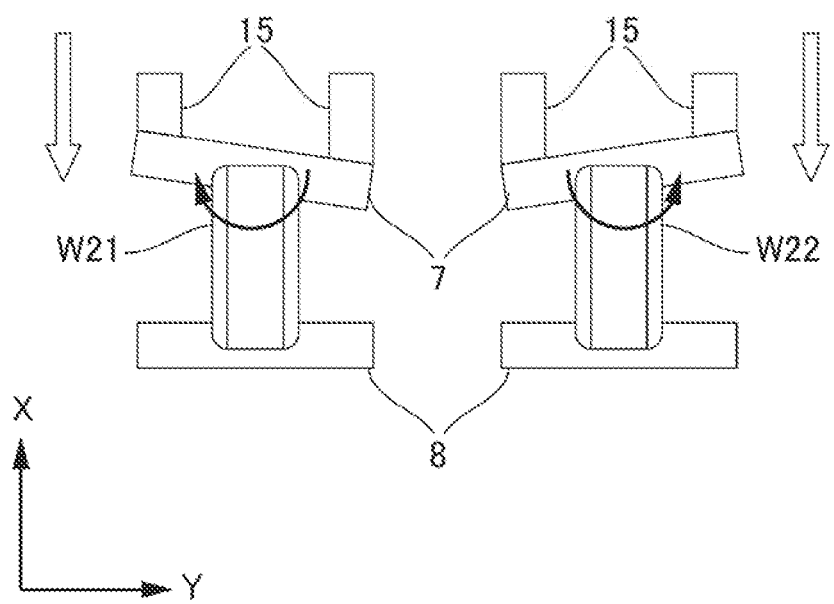

FIG. 15
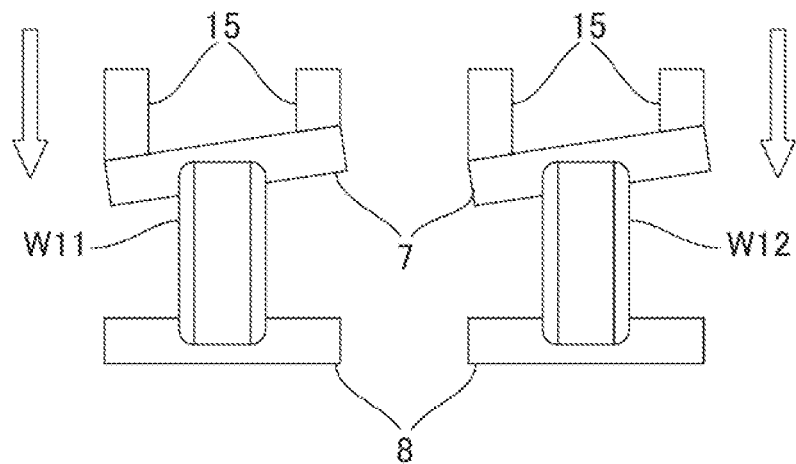
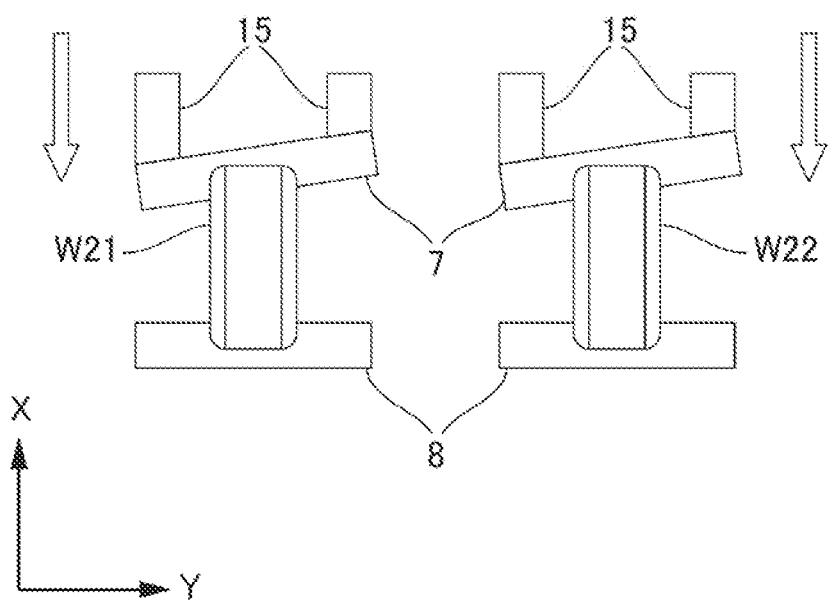

FIG. 16
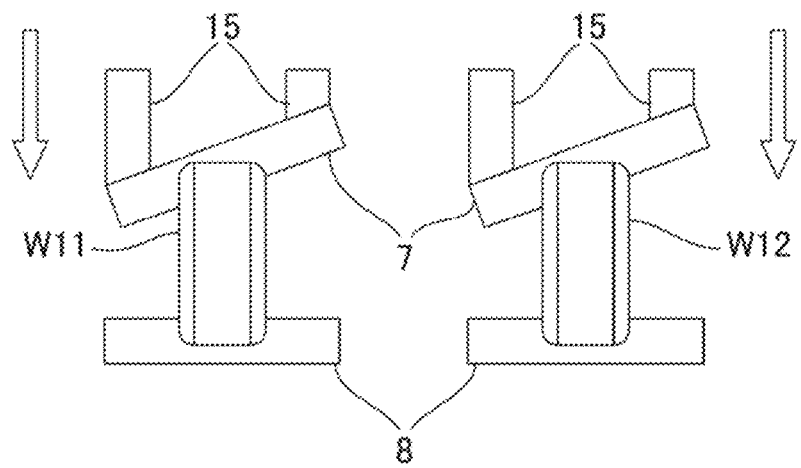
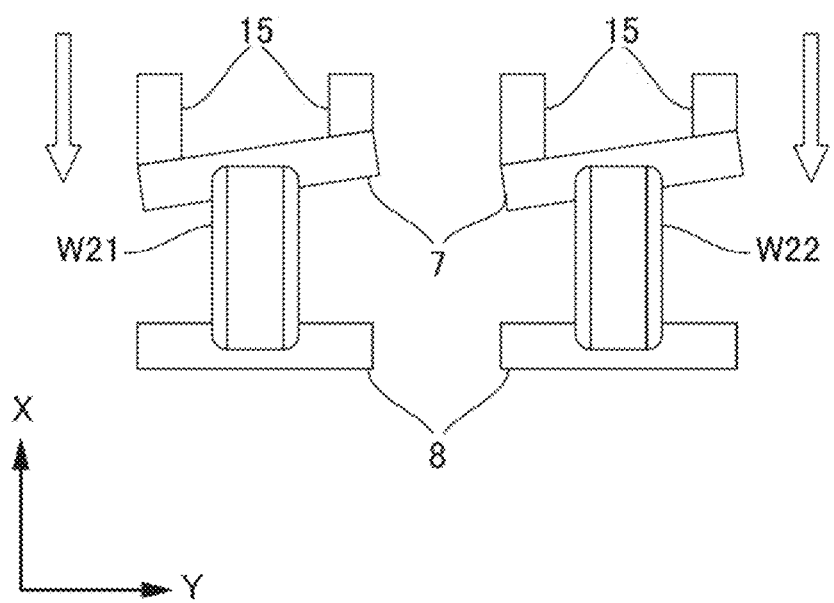

VEHICLE VIBRATION DEVICE

This application is based on and claims the benefit of priority from Japanese Patent Application No. 2021-135207, filed on 20 Aug., 2021, the content of which is incorporated herein by reference.

BACKGROUND OF THE INVENTION

Field of the Invention

The present invention relates to a vehicle vibration device.

Related Art

In order to test the durability of vehicles, quietness inside the vehicle, etc., a vibration device which vibrates the vehicle has been used. By pinching each wheel of the vehicle in the front/rear direction by a front shaft and a rear shaft extending in the left/right direction, and moving the front shaft in the front/rear horizontal direction, an excitation device for vehicles which vibrates wheels back and forth in the vertical direction has been proposed (for example, refer to Patent Document 1). In addition, by vibrating the tire using a vibration plate in an oblique direction shifted by a predetermined angle relative to the vertical direction, a vibration device configured so as to precisely imitate travel of a vehicle has been proposed (for example, refer to Patent Document 2). On the other hand, the vibration device performing vibration in each direction among the front/rear, left/right and vertical of the vehicle has already been commercialized.

Patent Document 1: PCT International Publication No. WO2020/218251
Patent Document 2: Japanese Unexamined Patent Application, Publication No. 2021-43094

SUMMARY OF THE INVENTION

There are many interior parts of a vehicle which are arranged at a side surface such as door parts, and these parts tend to vibrate in the left/right direction. For this reason, resonance of constituent parts is excited by vibrating in the left/right direction to test the existence of abnormal noise generation. The input of running vibration including vibration in the left/right direction is difficult with the vibration devices of Patent Document 1 or Patent Document 2, and even if practically using a curve etc. in actual travel, the vibration which can be inputted is only for a short time even if applying a curve or the like in actual running, and thus evaluation has been difficult. On the other hand, the existing vibration devices which perform vibration in each direction among front/rear, left/right and vertical of the vehicle are structures which vibrate by a total of 12 actuators, and thus high cost; therefore, it is not possible to imitate actual travel states. For this reason, conventionally, evaluation related to travel vibration including vibration in the left/right direction has been realized ultimately by performing running test using a test course. There are problems in this evaluation in that time is consumed, and costs accumulate.

The present invention was made taking account of the above situation, and has an object of providing a vehicle vibration device which can perform vibration imitating the actual travel state including vibration in the left/right direction, while being a simple configuration.

A vehicle vibration device (for example, the vehicle vibration device 1 described later) according to a first aspect of the present invention vibrates wheels (for example, the wheels W described later) back and forth in a vertical direction by pinching in a front/rear direction each wheel of a vehicle (for example, the vehicle 2 described later) by a front shaft (for example, the front shaft 7 described later) and a rear shaft (for example, the rear shaft 8 described later) which extend in a left/right direction, and causing the front shaft to move back and forth in a horizontal direction, the vehicle vibration device including: a variable mechanism (for example, the variable mechanism VM described later) which makes orientation of the front shaft variable, in which the variable mechanism includes left and right movement mechanisms (for example, the movement mechanism 10 described later) which are respectively connected to both left and right ends of the front shaft and are capable of moving both the left and right ends back and forth, and causes orientation of the front shaft to vary by making movement amounts by the left and right movement mechanisms to differ, and vibrates the wheels back and forth in a vertical direction, as well as vibrating in a left/right direction.

According to a second aspect of the present invention, the vehicle vibration device as described in the first aspect further includes a controller (for example, the controller 20 described later) which controls the variable mechanism so as to reproduce a virtual travel state imitating an actual travel state of the vehicle.

According to a third aspect of the present invention, in the vehicle vibration device as described in the second aspect, the controller controls the variable mechanism so as to establish left and right wheels in a toe-in state, so as to reproduce the virtual travel state in a case of the vehicle being a brake state.

According to a fourth aspect of the present invention, in the vehicle vibration device as described in the second aspect, the controller controls the variable mechanism so as to move the vehicle in a width direction by equally varying each of the front shafts in the same direction relative to the left and right wheels so as to reproduce the virtual travel state in a case of the vehicle being a lateral slide state.

According to a fifth aspect of the present invention, in the vehicle vibration device as described in the second aspect, the controller controls so as to make each of the front shafts variable in the same direction relative to front and rear wheels to reproduce the virtual travel state in a case of the vehicle being a turning state, and to tilt the front shaft relative to the front wheel greater than the front shaft relative to the rear wheel.

According to a sixth aspect of the present invention, in the vehicle vibration device as described in the first aspect, one end (for example, the right retained body part 29 on a right end side described later) among both left and right ends of the front shaft is connected (for example, connected by the spherical joint 17 described later) slidably in a left/right direction with a corresponding of the movement mechanisms, and another end (for example, the left retained body part 27 on a left end side described later) is connected (for example, connected by the elliptical joint 13 described later) to be non-slidable with a corresponding of the movement mechanisms.

According to a seventh aspect of the present invention, in the vehicle vibration device as described in the first aspect, both left and right ends of the front shaft are connected rotatably (for example, rotatable by the elliptical joint 13 and spherical joint 17 described later) in a horizontal direction respectively with a corresponding of the movement mechanisms.

According to a eighth aspect of the present invention, in the vehicle vibration device as described in the seventh aspect, either end (for example, the left retained body part 27 on a left end side described later) among both left and right ends of the front shaft is formed in an elliptical shape in which a major axis follows a shaft line direction of the front shaft.

The vehicle vibration device of the first aspect pinches in the front/rear direction the wheels by the front shaft and rear shaft extending in the left/right direction, and makes the orientation of the front shaft variable by the variable mechanism, upon vibrating the wheels back and forth in the vertical direction by causing the front shaft to move back and forth in a horizontal direction. For this reason, it is possible to perform vibration imitating an actual travel state including vibration in the left/right direction with a simple configuration.

With the vehicle vibration device of. the second aspect, it is possible to reproduce a virtual travel state imitating an actual travel state of the vehicle, under the control by the controller.

With the vehicle vibration device of the third aspect, it is possible to reproduce a virtual travel state in the case of the vehicle being in a braking state, by establishing left and right wheels in a toe-in state, under the control by the controller.

With the vehicle vibration device of the fourth aspect, it is possible to reproduce a virtual travel state in a case of the vehicle being a lateral slide state, by making each of the front shafts relative to the left and right wheels equally variable in the same direction, and moving the wheels in the width direction, under the control by the controller. With the vehicle vibration device of the fifth aspect, it is possible to reproduce a virtual travel state in a case of the vehicle being a turning state, by making each of the front shafts relative to the front and rear wheels variable in the same direction, and tilting the front shafts related to the front wheel more greatly than the front shafts related to the rear wheel, under the control by the controller.

With the vehicle vibration device of. the sixth aspect, it is possible to reproduce a virtual travel state as intended, by appropriately displacing the front shafts, since one end among both left and right ends of the front shafts is connected slidably in the left/right direction with a corresponding movement mechanism, and the other end is connected to be non-slidable with a corresponding movement mechanism.

With the vehicle vibration device of the seventh aspect, it is possible to reproduce a virtual travel state as intended, by appropriately displacing the front shafts, since both left and right ends of the front shafts are connected to be rotatable in a horizontal direction with each corresponding movement mechanism.

With the vehicle vibration device of the eighth aspect, it is possible to reproduce a virtual travel state as intended, by appropriately displacing the front shafts, since one end among both left and right ends of the front shafts is formed in an elliptical shape having a major axis following the shaft-line direction of the front shaft.

BRIEF DESCRIPTION OF THE DRAWINGS

FIG. 13 is a view for explaining an aspect of performing vibration imitating a state during normal straight travel by the vehicle vibration device in FIG. 1;

FIG. 14 is a view for explaining an aspect of performing vibration imitating a state during brake operation by the vehicle vibration device in FIG. 1;

FIG. 15 is a view for explaining an aspect of performing vibration imitating a left/right lateral slide state by the vehicle vibration device in FIG. 1; and FIG. 16 is a view for explaining an aspect of performing vibration imitating a state during curve travel by the vehicle vibration device in FIG. 1.

DETAILED DESCRIPTION OF THE INVENTION

Figure 1:
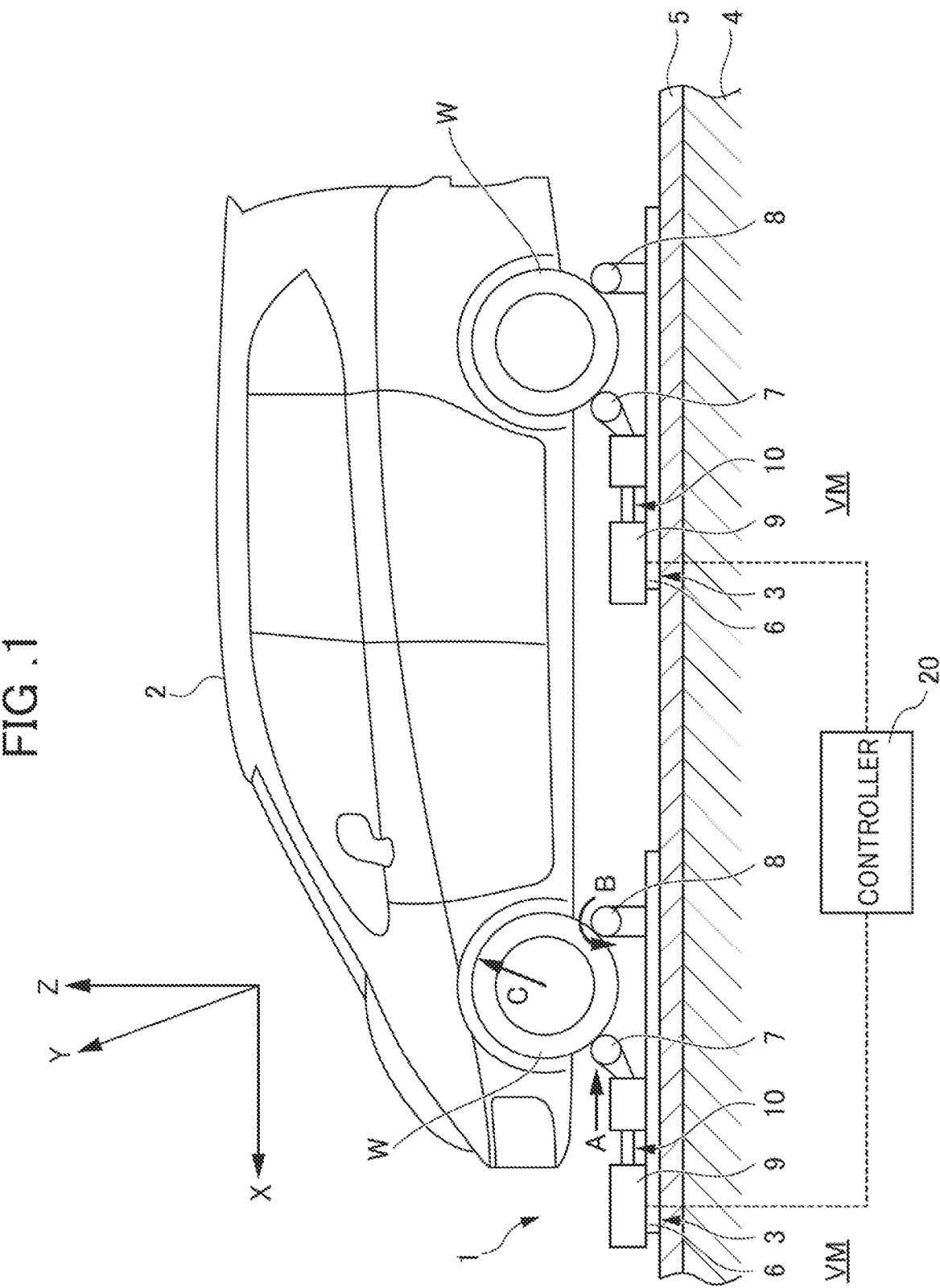
FIG. 1 is a conceptual view showing an aspect of vibrating a test vehicle by a vehicle vibration device according to an embodiment of the present invention.
Figure 2:
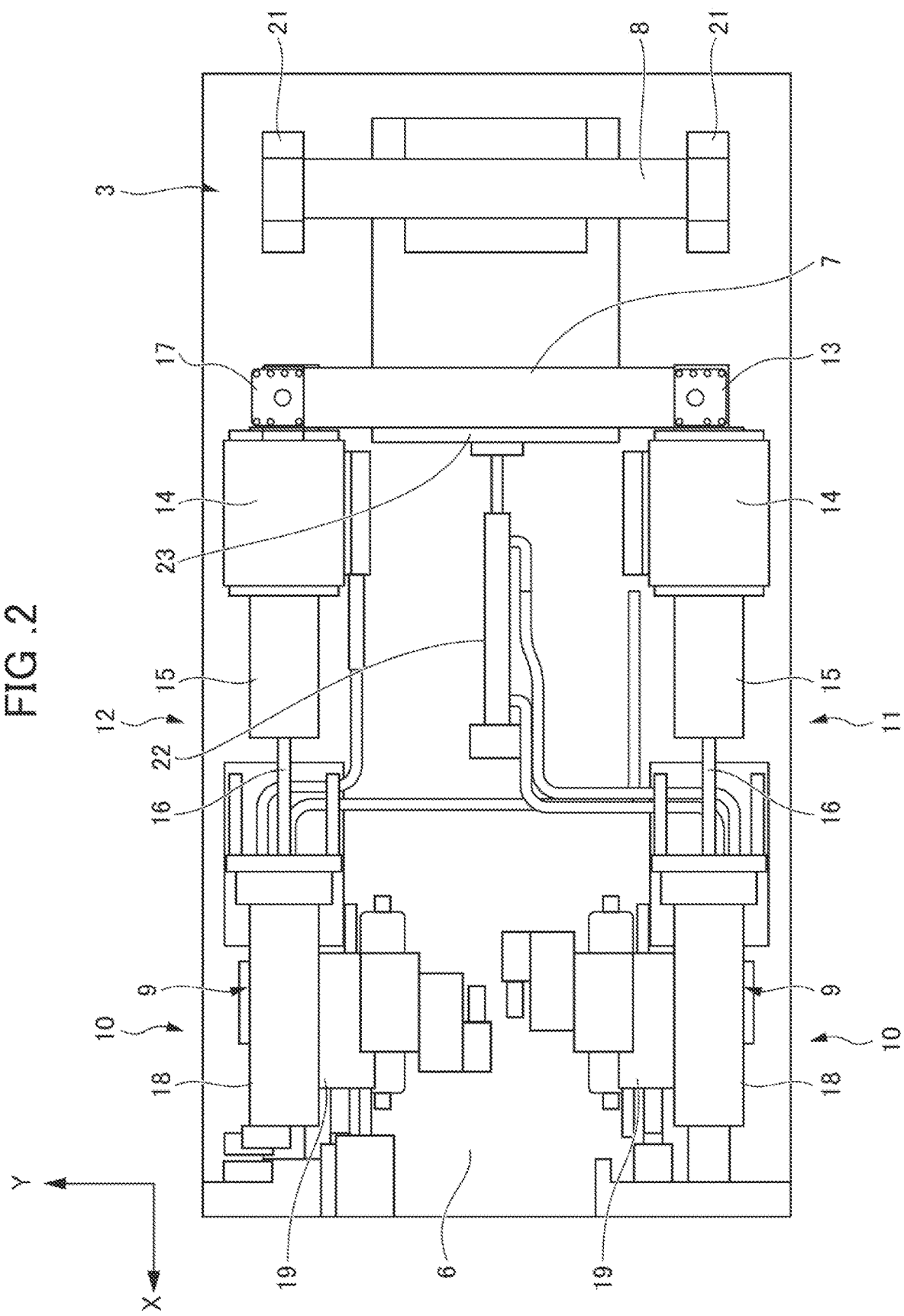
FIG. 2 is a view showing the configuration of one vibrator base portion of the vehicle vibration device in FIG. 1.
Figure 3:
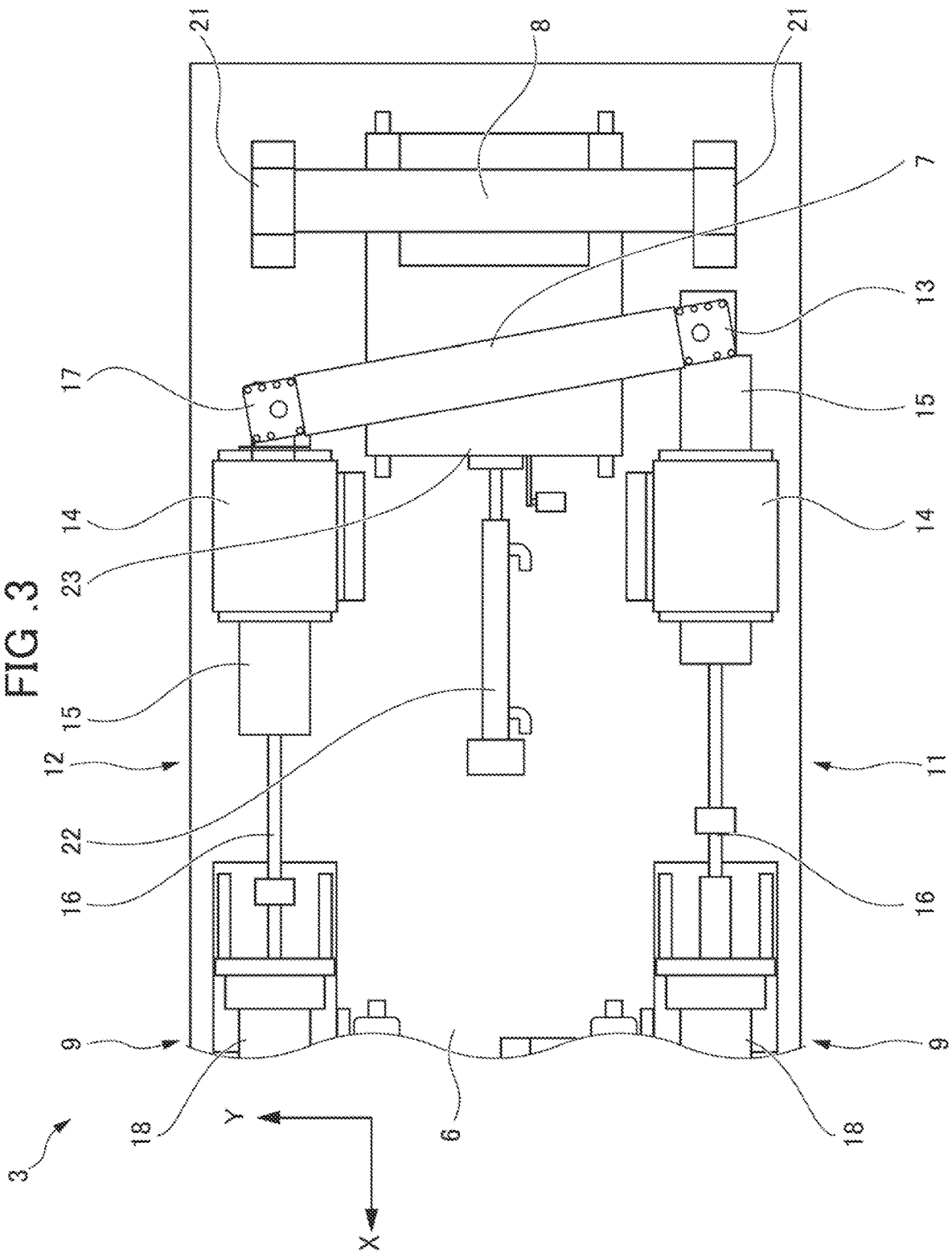
FIG. 3 is a view for explaining operation of a vibrator base portion in FIG. 2.

Next, an embodiment of the present invention will be explained while referencing the drawings. In each figure shown below, the same reference numbers are attached to identical portions or corresponding portions. FIG. 1 is a conceptual view showing an aspect of vibrating a vehicle which is a test vehicle by a vehicle vibration device 1 according to an embodiment of the present invention. FIG. 2 is a view showing the configuration of one vibrator base portion of the vehicle vibration device 1. FIG. 3 is a view for explaining operation of the vibrator base portion in FIG. 2.

The vehicle vibration device 1 has four vibrator bases 3 corresponding to each of the four wheels W of a vehicle 2, which is the test vehicle. Each of the four vibrator bases 3 have analogous configurations. The vibrator bases 3 are respectively provided at the positions corresponding to each of the four wheels W of the vehicle 2 on a plate-like base 5 fixed horizontally to a horizontal floor 4 of a solid structure such as a test building. As in FIG. 1, in the case of the vehicle 2 being installed at a normal position when testing by the vehicle vibration device 1, the front/rear (vehicle length) direction of the vehicle 2 is shown by the X axis, the left/right (vehicle width) direction is shown by the Y axis, and the vertical (perpendicular) direction is shown by the Z direction. In the following explanation, the notation of each direction among front/rear, left/right and vertical are the above meanings except for special cases.

The vibrator bases 3 are configured on a mobile base plate 6 placed on the base 5. In other words, the vibrator base 3 is configured by the front shaft 7 and rear shaft 8 which are separated so as to pinch a corresponding wheel W of the vehicle 2 and extend in the left/right direction, and a movement mechanism 10 including an actuator 9 which causes the front shaft 7 to move in the front/rear horizontal direction being provided on a mobile base plate 6. A total of four of the vibrator bases 3 are provided to correspond to each of the four wheels W of the vehicle 2.

As shown in FIG. 1, with the vibrator base 3 of the vehicle vibration device 1, when pinching the wheel W in the front/rear direction by the front shaft 7 and rear shaft 8, and moving the front shaft 7 in the horizontal direction by the driving force shown by the arrow A by the actuator 9 of the movement mechanism 10, the rear shaft 8 rotates as by arrow B, and the wheel W displaces upwards obliquely in the front/rear direction as by arrow C. By reciprocated driving by the actuator 9, the wheel W is vibrated in the front/rear and vertical directions.

The movement mechanism 10 is a generic term of a left-side movement mechanism 11 imparting driving force for moving to the left end side of the front shaft 7, and a right-side movement mechanism 12 imparting driving force for moving to the right end side of the front shaft 7. The left-side movement mechanism 11 and right-side movement mechanism 12 have similar configurations. For this reason, they are called the movement mechanism 10 without distinguishing between the left-side movement mechanism 11 and right-side movement mechanism 12.

When referencing FIG. 2, the left end side of the front shaft 7 is connected to an end (rear end) of a left-side vibration shaft 15 supported to be moveable in the front/rear direction by a hydrostatic bearing 14 at an elliptical joint 13. In addition, the right end side of the front shaft 7 is connected to one end (rear end) of the right-side vibration shaft 15 supported to be moveable in the front/rear direction by a hydrostatic bearing 14 at a spherical joint 17. The other end (front end) of each vibration shaft 15 is connected concentrically to a drive shaft 16 of the actuator 9.

The actuator 9 has a hydraulic cylinder 18 outputting driving force in the front/rear direction to the drive shaft 16, and a hydraulic circuit 19 operating this. The hydraulic circuit 19 operates under the control of a controller 20 in FIG. 1. The vibration shaft 15 thereby operates so as to reciprocally move in the axial direction. Therefore, the front shaft 7 displaces in the front/rear direction, while parallel in the left/right direction (Y-axis direction), or while maintaining the posture sloped by a predetermined angle in the left/right direction (Y axis direction), according to the feed amount of each vibration shaft 15 connected to both end sides of the front shaft 7. In the present embodiment, the front shaft 7 does riot rotate around the axis. However, the front shaft 7 may be configured so as to rotate around the axis.

On the other hand, the rear shaft 8 is supported to be rotatable around its own axis, extending in the left/right direction on the mobile base plate 6, by the support member 21 on both end sides thereof, and so that the position is fixed relative to the mobile base plate 6. Rotation around the axis of the rear shaft 8 is passive rotational displacement accompanying the rotational displacement of the wheel W. It should be noted that a releasing drive cylinder 22 generating driving force in the front/rear direction is provided at a central part on the mobile base plate 6. The releasing drive cylinder 22 is an electrohydraulic cylinder, drives a release assist member 23, applies braking to the rear shaft 8, and assists so that the wheel W of the test vehicle can release from between the front shaft 7 and rear shaft 8.

In the state of FIG. 2, each actuator 9 of the left-side movement mechanism 11 and right-side movement mechanism 12 are both in a state equally most pulling back the drive shafts 16 thereof. For this reason, each vibration shafts 15 of the left-side movement mechanism 11 and right-side movement mechanism 12 are equally ab the most retracted positions. As a result thereof, as in FIG. 2, the front shaft 7 and rear shaft 8 are in a parallel state extending in the left/right direction. It should be noted that, herein, position at which the vibration shaft 15 retracted is a position hitting a front side relatively, for the front/rear of the vehicle 2 in FIG. 1. Therefore, for each vibration shaft 15, advanced position is a position hitting a rear side relatively, for the front/rear of the vehicle 2 in FIG. 1.

When referencing FIG. 3, the actuator 9 of the left-side movement mechanism 11 advances the drive shaft 16, and advances the vibration shaft 15 to rearwards along a horizontal direction, which is the axial direction. In contrast, the actuator 9 of the right-side movement mechanism 12 maintains the drive shaft 16, and thus the vibration shaft 15, in the most pulled back state. As a result thereof, according to the difference in advanced length of each vibration shaft 15 of the left-side movement mechanism 11 and right-side movement mechanism 12, the front shaft 7 enters a state sloped by a certain angle relative to the left/right direction. By maintaining the difference in advanced length of the vibration shafts 15, and reciprocating the actuator 9 so as to translationally move each vibration shaft 15 of the left-side movement mechanism 11 and right-side movement mechanism 12 by equal amounts, the front shaft 7 vibrates the wheel W maintaining the aforementioned sloped angle. Selection of the sloped angle and vibration operation of such front shaft 7 are performed by the controller 20 controlling operation of the actuator 9. In other words, the movement mechanism 10 including the actuator 9 and the controller 20 constitute a variable mechanism VM which makes the orientation of the front shaft 7 variable.

Figure 4:
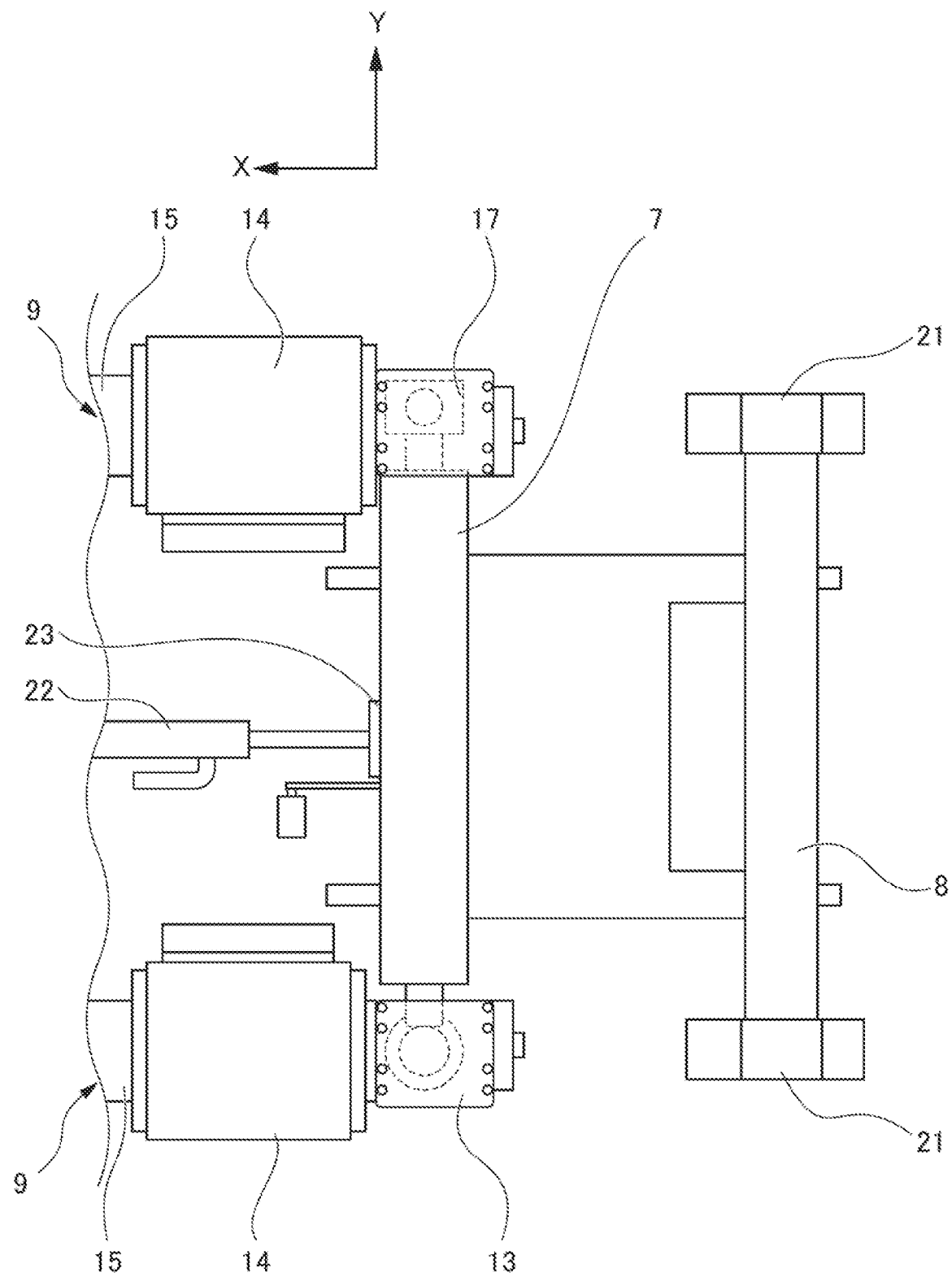
FIG. 4 is a view for explaining a front shaft of the vibrator base portion in FIG. 2 and a joint at both ends thereof.
Figure 5:
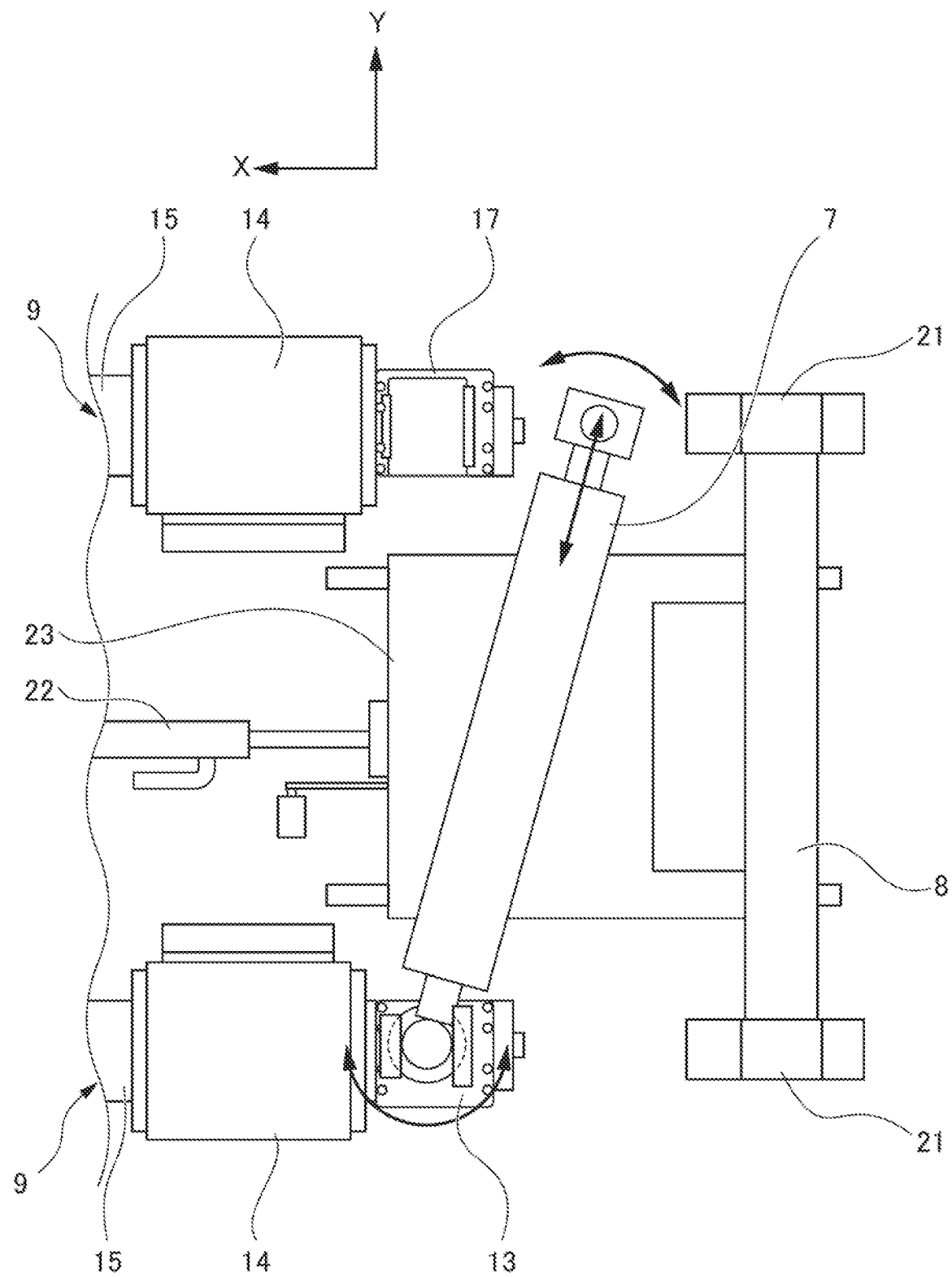
FIG. 5 is a view for explaining operation of the front shaft in FIG. 4.
Figure 6:
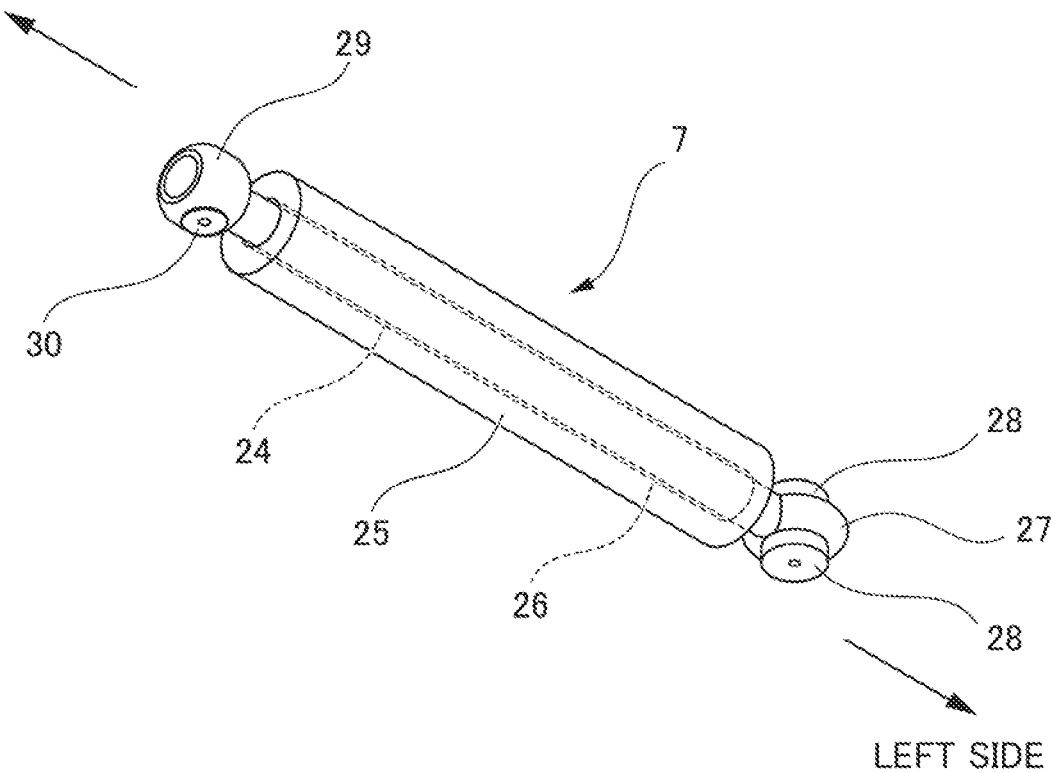
FIG. 6 is a view showing the structure of the front shaft in FIG. 4.
Figure 7:
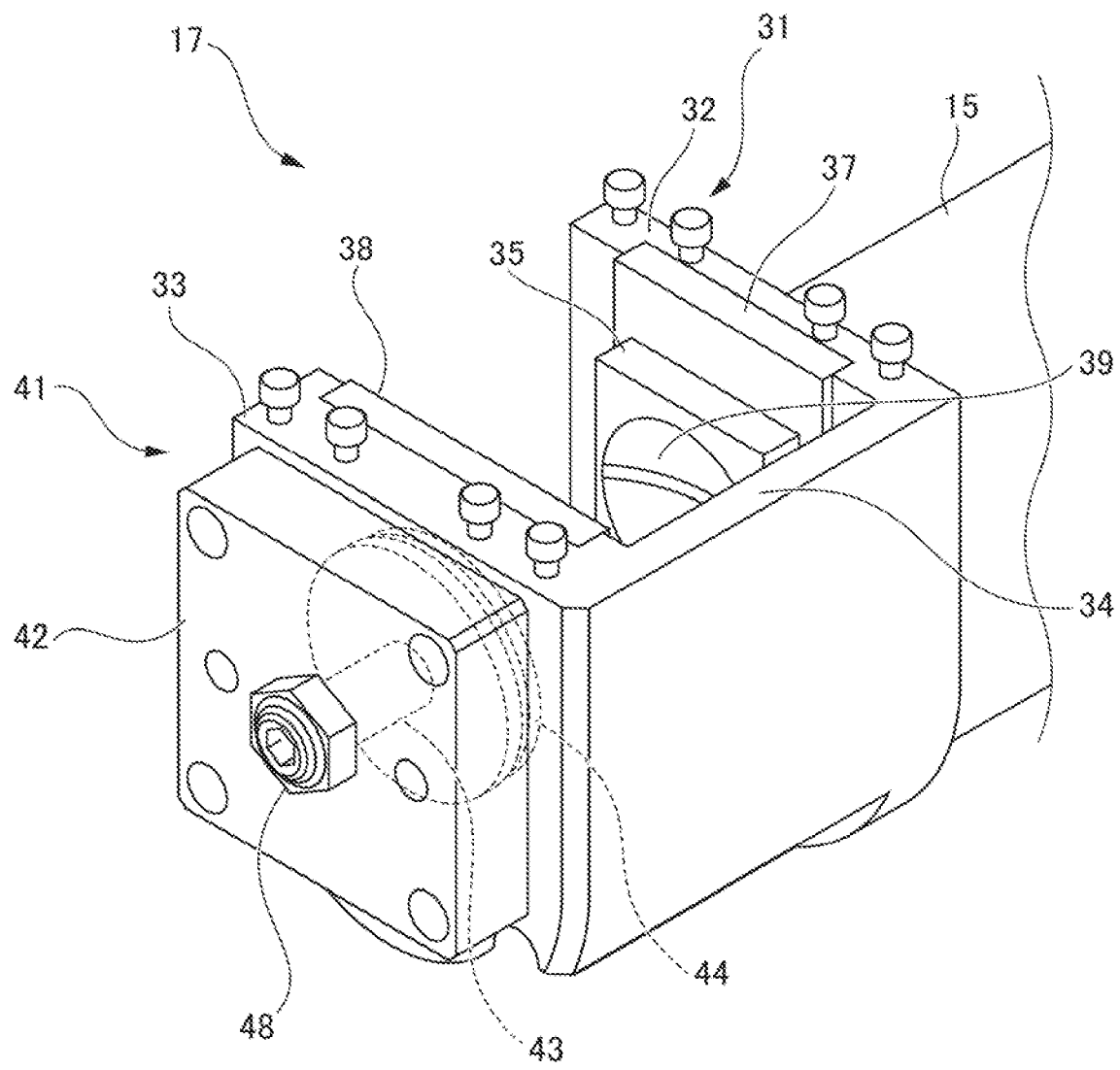
FIG. 7 is a view for explaining the structure of one among both joints in FIG. 4.

Next, referring to FIGS. 4 to 12, the elliptical joint 13 and spherical joint 17 provided to left and right ends of the front shaft 7 will be explained. FIG. 4 is a view for explaining the front shaft 7 and the elliptical joint 13 at the left end thereof and the spherical joint 17 at the right end thereof. FIG. 5 is a view for explaining operation of the front shaft 7 in FIG. 4 together with actions of the elliptical joint 13 and spherical joint 17. FIG. 6 is a view showing details of the structure of the front shaft 7. FIG. 7 is a view showing the structure of the spherical joint 17.

Figure 8:
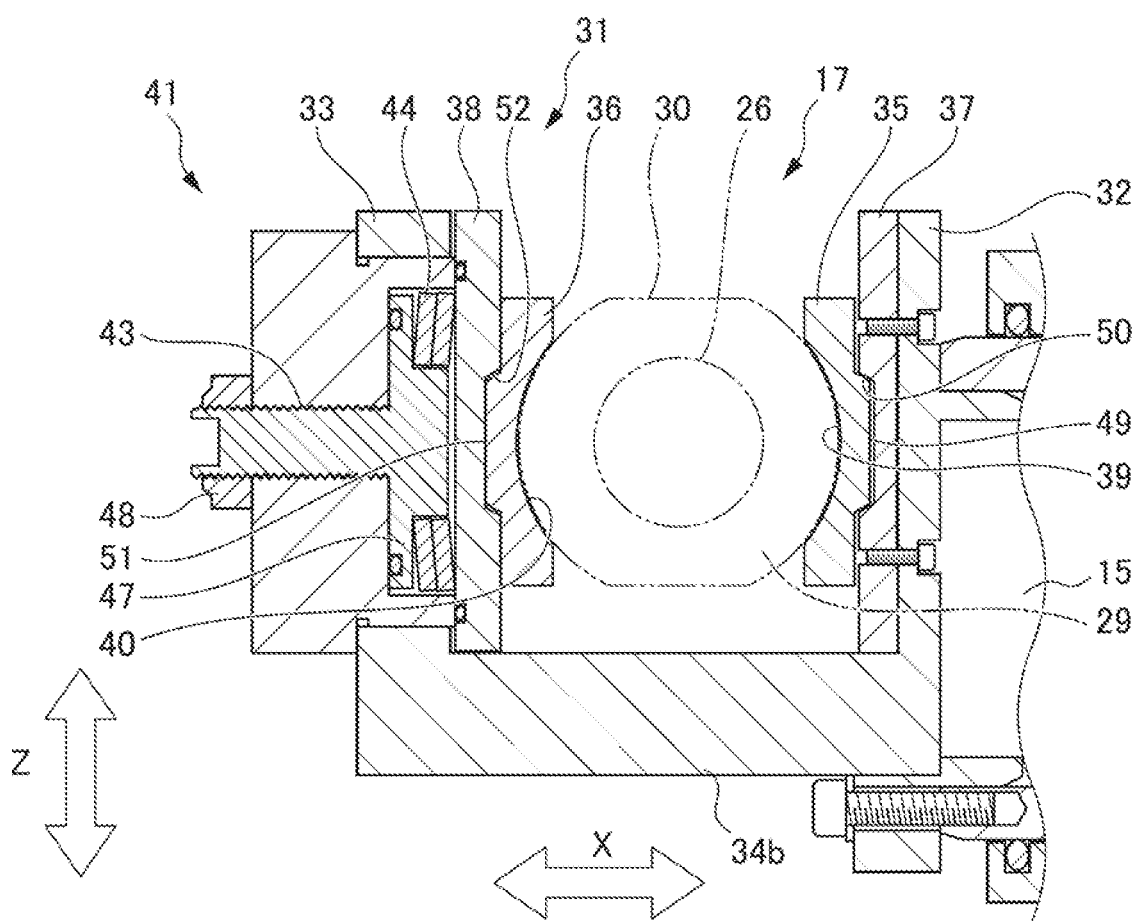
FIG. 8 is a view for explaining the internal structure and operation of the joint in FIG. 7.
Figure 9:
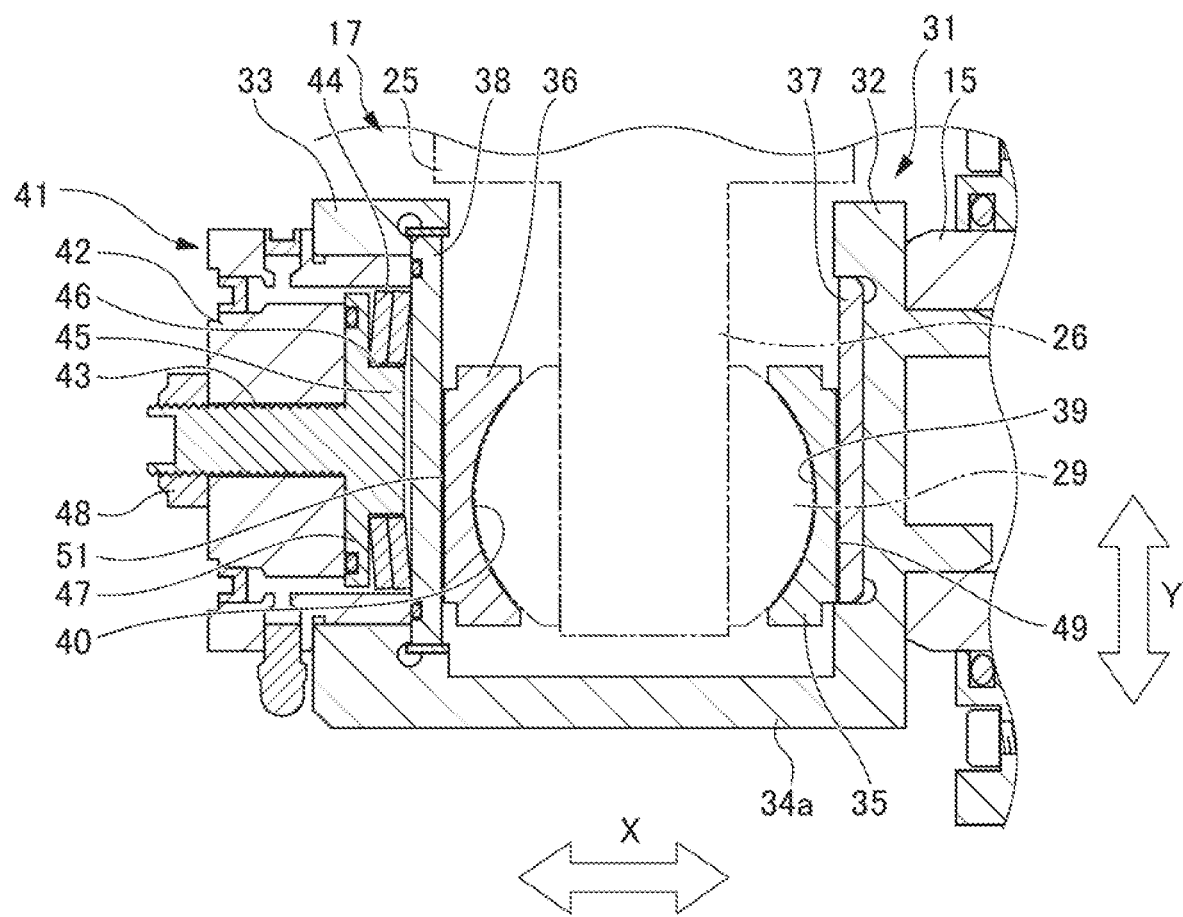
FIG. 9 is a view for explaining the internal structure and operation of the joint in FIG. 7.
Figure 10:
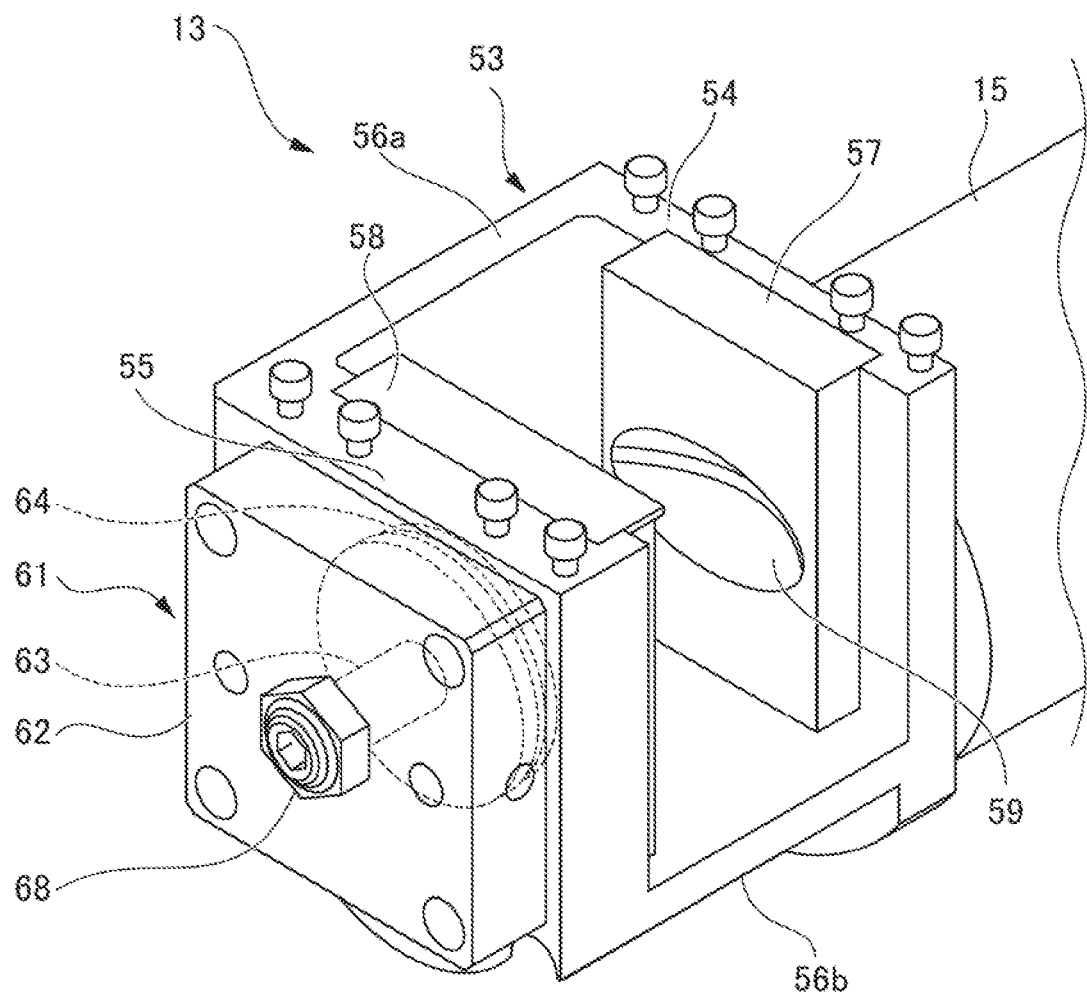
FIG. 10 is a view for explaining the structure of the other joint among both joints in FIG. 4.
Figure 11:
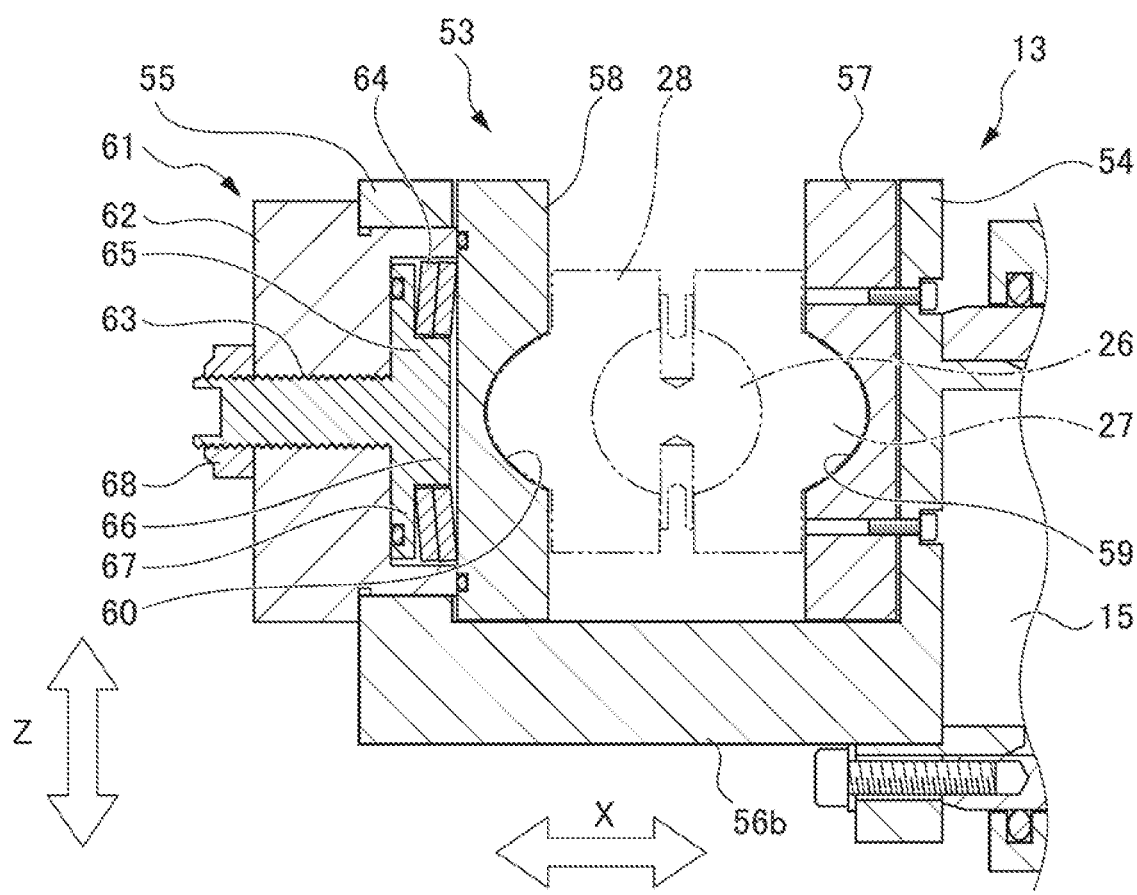
FIG. 11 is a view for explaining the internal structure and operation of the joint in FIG. 10.
Figure 12:
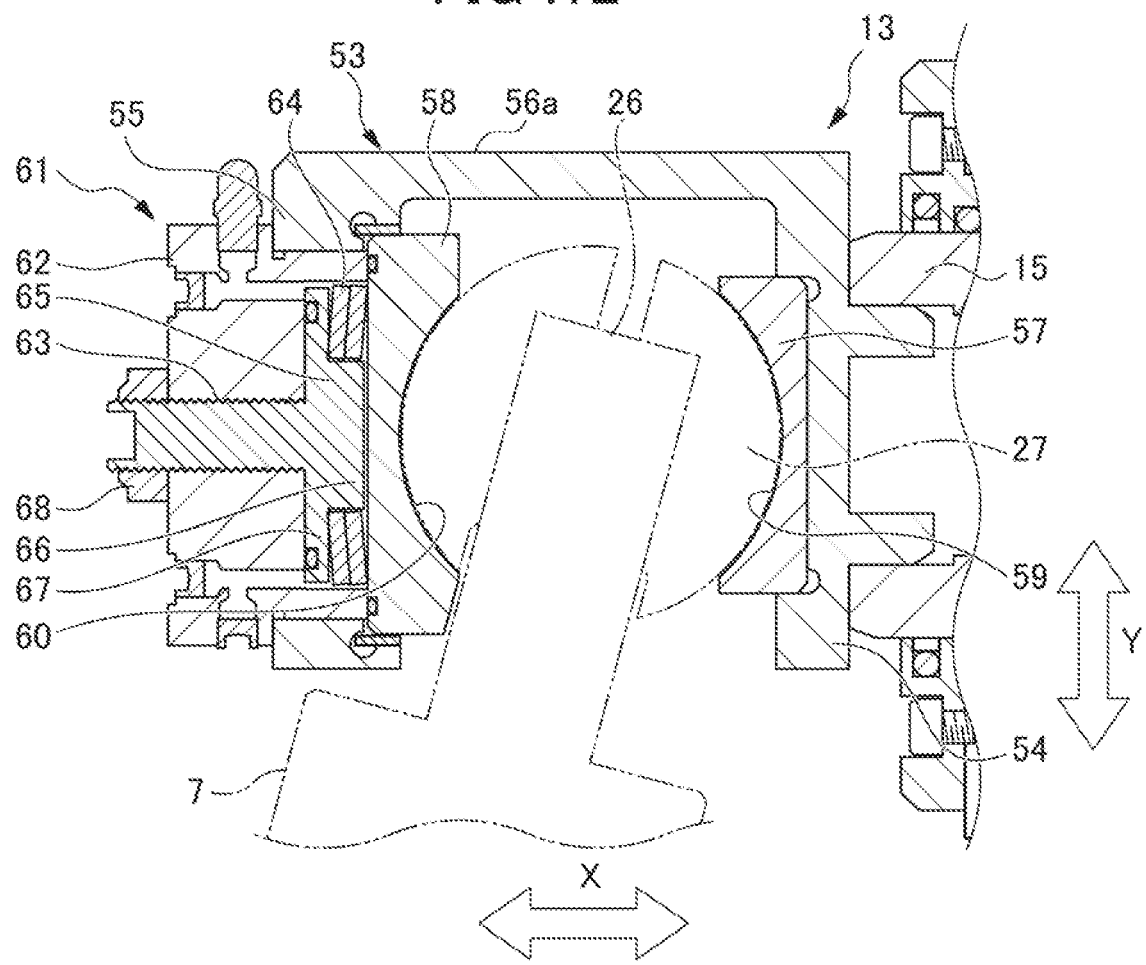
FIG. 12 is a view for explaining the internal structure and operation of the joint in FIG. 10.

FIG. 8 is a conceptual diagram for explaining operation in a state laterally viewing the structure of the spherical joint 17. FIG. 9 is a conceptual diagram for explaining operation in a state viewing the structure of the spherical joint 17 in a plane. FIG. 10 is a view showing the structure of the elliptical joint 13. FIG. 11 is a conceptual diagram for explaining operation in a state laterally viewing the structure of the elliptical joint 13. FIG. 12 is a conceptual diagram for explaining operation in a state viewing the structure of the elliptical joint 13 in a plane.

The vibration shafts 15 of each of the left-side movement mechanism 11 and right-side movement mechanism 12 are both movably guided in the front/rear direction by the hydrostatic bearings 14. In other words, both vibration shafts 15 advance and retract in the front/rear direction maintaining parallelism. Therefore, from the state in which the front shaft 7 is parallel to the rear shaft 8 extending in the left/right direction as in FIG. 4, when reaching a state in which the front shaft 7 slopes relative to the rear shaft 8 extending in the left/right direction as in FIG. 5, the required length dimension of the front shaft 7 varies. For this reason, in the present embodiment, a dimensional variation absorbing mechanism is configured by the front shaft 7 and a joint at the end thereof, whereby variation in the aforementioned required length dimension is absorbed.

Next, when referencing FIG. 6, the front shaft 7 is shown to be reversing left and right. The front shaft 7 has a shaft main body 25 in which a hollow part 24 is formed passing in an axial direction through an axial center portion of a cylindrical body which is a rigid body, and an axial center rod 26 passing through the entire length of the hollow part 24 and having both ends projecting from the shaft main body 25. A left retained body part 27 having a portion of a flat curvilinear solid is provided to the left end side of the axi.al center rod 26. This curvilinear solid has an elliptical-shaped cross-section for which the major axis follows the shaft-line direction of the axial center rod 26, and the cross-sectional shape orthogonal to the axis is also an elliptical shape, and the major axis thereof is the front/rear direction (X-axis direction). By configuring so as to circumscribe the outline of elliptical shape at both ends of the minor axis of this elliptical shape, disk-shaped bodies 28 having a smaller diameter than the major axis of elliptical shape are provided in pairs to each of the aforementioned portions of the curvilinear solid. In addition, a right retained body part 29 having a spherically-shaped portion is provided to the right end side of the axial center rod 26. At both end sides of the diameter in the vertical direction of the spherically-shaped portion, a disk-shaped part 30 having a diameter smaller than the diameter of the right retained body part 29 is formed in the right retained body part 29, by cutting out a part of the circular outline.

Next the spherical joint 17 will be explained in detail by referencing FIGS. 6 to 9. Herein, in the explanation of the spherical joint 17, an advancing direction of the vibration shaft 15 is called "front" and a retracting direction of the vibration shaft 15 is called "rear", except for portions in parenthesis. The spherical joint 17 is configured by the right retained body part 29 on the right end side of the axial center rod 26 being slidably accommodated and retained within a spherical joint housing 31 connected to the vibration shaft 15. The spherical joint housing 31 is configured so as to surround the right retained body part 29 by a housing rear plate 32 and housing front plate 33 each having a rectangular external form, opposing to be separated more than the diameter of the spherically-shaped portion of the right retained body part 29; and a housing side plate 34*a* and a housing bottom plate 34*b* linking each outside edge of the housing rear plate 32 and housing front plate 33 and having rectangular external forms.

A rear slider 35 and front slider 36 are provided slidably in the left/right direction (Y-axis direction) respectively at sides mutually facing of the housing rear plate 32 and housing front plate 33. A rear-side interposed plate 37 is interposed between an inner face of the housing rear plate 32 and back face of the rear slider 35. In addition, a front-side interposed plate 38 is interposed between an inner face of the housing front plate 33 and back face of the front slider 36.

A rear-side spherical concave-shaped retaining part 39 corresponding to a portion of the outer face of the spherical portion of the right retained body part 29 is formed at the front face side of the rear slider 35. In addition, a front-side spherical: concave-shaped retaining part 40 corresponding to a portion of the outer face of the spherical portion of the right retained body part 29 is formed at the rear face side of the front slider 36. The right retained body part 29 is sandwiched to be rotatable and slidable by the opposing rear-side spherical concave-shaped retaining part 39 and front-side spherical concave-shaped retaining part 40.

An adjustable block 41 of practically parallelepiped shape is installed to the outer face side (front side) of the housing front plate 33. The housing front plate 33 having a rectangular external form is a frame shape, and the adjustable block 41 is installed so as to fit together from the front with a central opening of this frame body. The adjustable block 41 has an adjustable block main body 42 which partially fits together with the housing front plate 33; a screw shaft 43 which passes through the center of the adjustable block main body 42 in the front/rear direction; and a spring retaining part 45 which retains an annular pressure-regulating spring 44 which abuts the front interposed plate 38 and pushes this in the front/rear direction.

The spring retaining part 45 has a cylindrical position retaining part 46 which projects towards the front interposed plate 38, and contacts an inner circumference of the pressure-regulating spring 44 to retain the central position thereof; and an annular pushing part 47 which is annularly located at the surroundings of the position retaining part 46 and pushes the pressure-regulating spring 44 from the back thereof (front side in X-axis direction). A screw shaft 43 integrally links to the back of the position retaining part 46 (front side in X-axis direction). To the screw shaft 43, an adjustable nut 48 is threaded to a portion at which this projects from the adjustable block main body 42.

Herein, in the rear slider 35, a guided convex part 49 formed in the back thereof (front side in X-axis direction) is guided in a guide groove 50 formed in the left/right direction (Y-axis direction) in the rear interposed plate 37, and is slidable in the left/right direction. Similarly, in the front slider 36, the guided convex part 51 formed in the back thereof (front side in X-axis direction) is guided in a guide groove 52 formed in the left/right direction (Y-axis direction) in the front interposed plate 38, and is slidable in the left/right direction.

When revolving the adjustable nut 48 of the adjustable block 41 to the appropriate position, the front interposed plate 38 is elastically pushed from the back thereof (front side in X-axis direction) by the pressure-adjusting spring 44, via the screw shaft 43 and annular pushing part 47. The front slider 36 slidingly contacting the front interposed plate 38 receiving this elastic pressing force, and the rear slider 35 opposing this are slidably displaceable in the left/right direction (Y-axis direction), while rotatably retaining between both the spherical portion of the right retained body part 29 around the axial center rod 26. In other words, the opposing front slider 36 and rear slider 35 are slidably displaceable in the left/right direction (Y-axis direction), while sandwiching the spherical portion of the right retained body part 29 by this front-side spherical concave-shaped retaining part 40 and rear-side spherical concave-shaped retaining part 39, with the appropriate elastic force from the pressure-adjusting spring 44.

For this reason, by the front shaft 7 sloping by a fixed angle relative to the left/right direction (Y-axis direction), even when the required length dimension thereof varies, this variation is absorbed within the spherical joint 17, by the sliding displacement to the left/right direction (Y-axis direction) of the front slider 36 and rear slide 35. Therefore, smooth vibration operation is continued in the front shaft 7 and vibration shafts 15 on both ends thereof, without tension hindering these operations from acting thereon. In this way, the dimensional variation absorption mechanism which absorbs variation in the required length dimension of the front shaft 7 is configured by including the right retained body part 29 of the axial center rod 26 and the spherical joint 17.

Next, the elliptical joint 13 will be explained in detail by referencing FIGS. 6 and 10 to 12. Herein, in the explanation of the elliptical joint 13, an advancing direction of the vibration shaft 15 is called "front" and a retracting direction of the vibration shaft 15 is called "rear", except for portions in parenthesis. The elliptical joint 13 is configured by the left retaining body part 27 on the left end side of the axial center rod 26 being slidably accommodated and retained within an elliptical joint housing 53 connected to the vibration shaft 15. The elliptical joint housing 53 is configured so as to surround the left retained body part 27 by a housing rear plate 54 and a housing front plate 55 separated more than the length of the major axis of the elliptical shape of the cross section of the left retained body part 27 and having rectangular external forms; a housing side plate 56a and a housing bottom plate 56b linking each outside edge of the housing rear plate 54 and housing front plate 55 and having rectangular external forms.

At the mutually facing sides of the housing rear plate 54 and housing front plate 55, a rear retaining member 57 and a front retaining member 58 are respectively provided. At the front face side of the rear retaining member 57, a rear-side non-spherical concave retaining part 59 corresponding to the portion of the external face of the left retained body part. 27 having a spherical cross-sectional shape is formed. In addition, at the rear face side of the front retaining member 58, a front-side non-spherical concave retaining part 60 corresponding to the portion of the external face of the left retained body part 27 having an elliptical cross-sectional shape is formed. The left retained body part 27 is sandwiched rotatably in the horizontal direction (in-plane direction of X-axis - Y-axis), and so that rotation about the axis related to the axial center rod 26 is restricted, by the opposing rear-side non-spherical concave retaining part 59 and front-side non-spherical concave retaining part 60.

An adjustable block 61 of practically parallelepiped shape is installed to the outer face side (front side) of the housing front plate 55. The housing front plate 55 having a rectangular external form is a frame shape, and the adjustable block 61 is installed so as to fit together from the front with a central opening of this frame body. The adjustable block 61 has an adjustable block main body 62 which partially fits together with the housing front plate 55; a screw shaft 63 which passes through the center of the adjustable block main body 62 in the front/rear direction; and a spring retaining part 65 which retains an annular pressure-regulating spring 64 which abuts the front interposed plate 58 and pushes this in the front/rear direction.

The spring retaining part 65 has a cylindrical position retaining part 66 which projects towards the front retaining member 58, and contacts an inner circumference of the pressure-regulating spring 64 to retain the central position thereof; and an annular pushing part 67 which is annularly located at the surroundings of the position retaining part 66 and pushes the pressure-regulating spring 64 from the back thereof (front side in X-axis direction). The screw shaft 63 integrally links to the back of the position retaining part 66 (front side in X-axis direction). To the screw shaft 63, an adjustable nut 68 is threaded to a portion at which this projects from the adjustable block main body 62.

When revolving the adjustable nut 68 of the adjustable block 61 to the appropriate position, the front retaining member 58 is elastically pushed from the back thereof (front side in X-axis direction) by the pressure-adjusting spring 64, via the screw shaft 63 and annular pushing part 67. The front retaining member 58 receiving this elastic pressing force, and a rear retaining member 57 opposing this retain between the two to be rotatable in a horizontal direction (in-plane direction of X-axis and Y-axis), the left retained body part 27 having a cross section in a direction orthogonal to the axial center rod 26 which is an elliptical shape, while regulating the rotation around the axial center rod 26.

For this reason, sloping of the axial center rod 26 is permitted for causing the front shaft 7 to slope by a fixed angle relative to the left/right direction (Y-axis direction).

Therefore, smooth vibration operation is continued in the front shaft 7 and vibration shaft 15 on both ends thereof, without tension hindering these operations from acting thereon.

Next, a control mode by the controller 20 in a case of performing vibration imitating various travel states by the vehicle vibration device 1 will be explained by referencing FIGS. 13 to 16. The respective drawings of FIGS. 13 to 16 are conceptual diagrams in a plan view. By pinching each of the left front wheel W11, right front wheel W12, left rear wheel W21 and right rear wheel W22 of the vehicle 2 in the front/rear direction by the front shafts 7 and rear shafts 8, and causing the front shafts 7 to move back and forth in the horizontal direction, vibration is done back and forth in the vertical direction. The front shaft 7 vibration displaces in the front/rear direction (X-axis direction) by the vibration shaft 15, while maintaining a fixed angle relative to the left/right direction (Y-axis direction), according to the purpose in the case of performing vibration.

It should be noted that the elliptical joint 13 and spherical joint 17 provided to left and right ends of the front shaft 7 are omitted from illustration in FIGS. 13 to 16. Upon actually selecting the sloping angle relative to the left/right direction (Y-axis direction) of the front shaft 7, this elliptical joint 13 and spherical joint 17 operate as already described, whereby maintaining the required sloping angle is permitted, and smooth vibration is performed.

FIG. 13 is a view for explaining an aspect of performing vibration imitating the state during normal straight travel by the vehicle vibration device 1. The front shafts 7 and rear shafts 8 are parallel along the left/right direction (Y-axis direction), relative to each of the left front wheel W11, right front wheel W12, left rear wheel W21 and right rear wheel W22. In other words, the front shaft 7 vibration displaces in the front/rear direction (X-axis direction), by maintaining a state in which a feed amounts (i.e. projection length to front/rear direction which is X-axis direction) of the vibration shafts 15 at both ends are equal. This operation is realized by the movement mechanism 10 operating under the control in a straight travel mode by the controller 20 of FIG. 1. As a result thereof, a vibration test imitating straight travel is performed.

FIG. 14 is a view for explaining an aspect of performing vibration imitating a state during brake operation by the vehicle vibration device 1. To each of the left front wheel. W11, right front wheel W12, left rear wheel W21 and right rear wheel W22, the rear shafts 8 maintain the left/right direction (Y-axis direction). On the other hand, relative to the left front wheel 11, the front shaft 7 is made to slope by a fixed angle so that the Y-axis direction left side retracts, and relative to the right front wheel W12, the front shaft 7 is made to slope at the same angle as above so that the Y-axis direction right side retracts. As a result thereof, in the left front wheel W11 and right front wheel W12, action strengthening the tendency for toe-in to the inner side from the Y-axis direction outer side is added, by the slope of the corresponding front shaft 7.

On the other hand, in the present embodiment, relative to each of the left rear wheel W21 and right rear wheel W22, the front shafts 7 add action offering a tendency for toe-out by reversely sloping than the case relative to the left front wheel Wil and right front wheel W12. Relative to each of the left front wheel W11, right front wheel W12, left rear wheel W21 and right rear wheel W22, the corresponding front shafts 7 vibration displace in the front/rear direction (X-axis direction) maintaining the aforementioned sloping angle.

The left front wheel W11, right front wheel W12, left rear wheel W21 and right rear wheel W22 thereby come to be vibrated back and forth in the vertical direction, and also vibrated in the left/right direction according to the slope of the front shaft 7. This motion is realized by the movement mechanism 10 acting under control in a brake mode by the controller 20 in FIG. 1. As a result thereof, vibration test imitating the state during brake operation is performed.

FIG. 15 is a view for explaining an aspect of performing vibration imitating a left/right lateral slide state by the vehicle vibration device 1. FIG. 15 corresponds to a case of the vehicle 2 receiving crosswind from the left side. Relative to each of the left front wheel W11, right front wheel W12, left rear wheel W21 and right rear wheel W22, the rear shafts 8 maintain the left/right direction (Y-axis direction). On the other hand, relative to each of the left front wheel W11, right front wheel W12, left rear wheel W21 and right rear wheel W22, the same angle slope is made so as to slope the corresponding front shafts 7 at fixed angles so that the Y-axis direction left side retracts. As a result thereof, action pushing the front side from the X-axis direction left side to the right side is added by the sloping of the corresponding front shaft 7 to the left front wheel W11 and left rear wheel W21. In addition, action pushing the front side from the X-axis direction left side to the right side is also added to the right front wheel W12 and right rear wheel W22.

In this case, the sloping angles of the front shafts 7 corresponding to the left front wheel W11 and right front wheel W12 are the same extent in the same direction. Relative to each of the left front wheel W11, right front wheel W12, left rear wheel W21 and right rear wheel W22, the corresponding front shafts 7 vibration displace in the front/rear direction (X-axis direction) maintaining the aforementioned sloping angle.

The left front wheel W11, right front wheel W12, left rear wheel W21 and right rear wheel W22 thereby come to be vibrated back and forth in the vertical direction, and also vibrated in the left/right direction according to the slope of the front shafts 7. This motion is realized by the movement mechanism 10 operating under control in a lateral slide mode by the controller 20 in FIG. 1. As a result thereof, a vibration test imitating the lateral slide state corresponding to a case of receiving crosswind from the left side is performed.

FIG. 16 is a view for explaining an aspect of performing vibration imitating a state during curve travel. FIG. 16 corresponds to a case of the vehicle 2 traveling on a left curve. Relative to each of the left front wheel W11, right front wheel W12, left rear wheel W21 and right rear wheel W22, the rear shafts 8 maintain the left/right direction (Y-axis direction). On the other hand, relative to each of the left front wheel W11, right front wheel W12, left rear wheel W21 and right rear wheel W22, the corresponding front shafts 7 are made to slope in the same trend direction so as to slope by a fixed angle so that the Y-axis direction left side retracts.

As a result thereof, action pushing the front side from the X-axis direction left side to the right side is added by the sloping of the corresponding front shaft 7 to the left front wheel W11 and left rear wheel W21. In addition, action pushing the front side from the X-axis direction left side to the right side is added by the sloping of the front shaft 7 also to the right front wheel W12 and right rear wheel W22. In this case, the sloping angles of the front shafts 7 corresponding to the left front wheel W11 and right front wheel W12 are the same extent in the same direction. The aforementioned sloping direction of the front shaft 7, as the trend thereof, is equal to the case of imitating the lateral slide state in FIG. 15.

However, in the case of imitating during curve travel in FIG. 16, the sloping angle of the front shafts 7 corresponding to the left front wheel W11 and right front wheel W12 is made greater than the case of FIG. 15. In other words, the sloping angle of the front shafts 7 corresponding to the left front wheel W1l and right front wheel W12 is made greater than the sloping angle of the front shafts 7 corresponding to the left rear wheel W21 and right rear wheel W22. Relative to each of the left front wheel W11, right front wheel W12, left rear wheel W21 and right rear wheel W22, the corresponding front shafts 7 vibration displace in the front/rear direction (X-axis direction) maintaining the aforementioned sloping angle.

The left front wheel W11, right front wheel W12, left rear wheel W21 and right rear wheel W22 thereby come to be vibrated back and forth in the vertical direction, and also vibrated in the left/right direction according to the slope of the front shaft 7. This motion is realized by the movement mechanism 10 operating under the control in a curve travel mode by the controller 20 of FIG. 1. As a result thereof, a vibration test imitating traveling on a left curve is performed.

According to the vehicle vibration device of the present embodiment, the following effects are exerted.

(1) The vehicle vibration device 1 pinches each of the wheels W of the vehicle 2 in the front/rear direction by the front shafts 7 and rear shafts 8 extending in the left/right direction, and vibrates back and forth in the vertical direction the wheels W by causing the front shafts 7 to move back and forth in the horizontal direction. The vehicle vibration device 1 includes the variable mechanism VM which makes the orientation of the front shafts 7 to be variable.

The variable mechanism VM includes left and right movement mechanisms 10 which are connected respectively to both left and right ends of the front shaft 7 can move back and forth both left and right ends, and makes the orientation of the front shaft 7 variable by causing the movement amounts by the left and right movement mechanisms 10 to differ, thereby vibrating the wheels W back and forth in the vertical direction, and also vibrates the wheels W in the left/right direction according to the sloping angle of the front shafts 7. For this reason, it is possible to perform vibration imitating the actual travel state including vibration in the left/right direction, while being a simple configuration.

(2) The vehicle vibration device 1 includes the controller 20 controlling the variable mechanism VN to reproduce a virtual travel state imitating the actual travel state of the vehicle 2. For this reason, under control by the controller 20, the vibration in the straight travel mode imitating a state during straight travel, vibration in the brake mode imitating a state during brake operation, vibration in a lateral slide mode imitating a left/right lateral slide state, vibration in a curve travel mode imitating during curve travel, etc. can be carried out freely.

(3) In the vehicle vibration device 1, the controller 20 controls the variable mechanism VM so as to establish the left and right wheels W11, W12 in a toe-in state, to reproduce a virtual travel state in the case of the vehicle 2 being a braking state. For this reason, it is possible to perform vibration in a brake mode imitating a state during brake operation.

(4) In the vehicle vibration device 1, the controller 20 controls the variable mechanism VM so as to move the vehicle 2 in the width direction by causing the front shafts 7 corresponding to each of the left and right wheels W11, W12 and wheels W21, W22 to be variable equally in the same direction to reproduce the virtual travel state in the case of the vehicle 2 being in the lateral slide state. For this reason, it is possible to perform vibration in the lateral slide mode imitating the lateral slide state.

(5) In the vehicle vibration device 1, the controller 20 controls so as to make the front shafts 7 corresponding to each of the front and rear wheels W11, W21, and wheels W12, W22 variable in the same direction, and slant the front shafts 7 related to the front wheels W11, W12 more greatly than the front shafts 7 related to the rear wheels W21, W22, in order to reproduce a virtual travel state in the case of the vehicle 2 being a turning state. For this reason, it is possible to perform vibration in a curve travel mode imitating during curve travel.

(6) Tn the vehicle vibration device 1, the right retained body part 29 on the right end side among both left and right ends of the front shaft 7 is connected by the spherical joint 17 to be slidable in the left/right direction with the corresponding movement mechanism 10, and the left retained body part 27 on the left end side is connected by the elliptical joint 13 to be non-slidable in the left/right direction with the corresponding movement mechanism 10. For this reason, it is possible to freely vary the sloping angle relative to the left/right direction (Y-axis direction) of the front shaft 7, and possible to reproduce motion with high positional accuracy smoothly.

(7) In the vehicle vibration device 1, the front shaft 7 has both left and right ends thereof connected by the elliptical joint 13 and spherical joint 17 to be rotatable in the horizontal direction with each corresponding movement mechanism 10. For this reason, it is possible to freely vary the sloping angle relative to the left/right direction (Y-axis direction) of the front shaft 7, and possible to smoothly reproduce motion with high positional accuracy.

(8) In the vehicle vibration device 1, the left retained body part 27 which is on the left end side among both left and right ends of the front shaft 7 is formed in an elliptical shape in which the major axis follows the shaft-line direction of the front shaft 7. For this reason, it is possible to freely vary the sloping angle relative to the left/right direction (Y-axis direction) of the front shaft 7, and possible for rotation around the axis of the front shaft 7 to be restricted, and smoothly reproduce motion with high positional accuracy.

Although an embodiment of the present invention has been explained above, the present invention is not limited thereto. The configurations of detailed parts may be appropriately modified within the scope of the gist of the present invention. For example, the aforementioned adopts a configuration performing by the same actuator the angular displacement for varying the sloping angle relative to the left/right direction (Y-axis direction) of the front shaft, and the vibration displacement for varying the spacing between the front shaft and rear shaft; however, a configuration performing these angular displacement and vibration displacement by separate actuators can be adopted. In addition, in the aforementioned, the movement direction of the front shaft is not limited to strictly horizontal, and may move the front shaft, which is the vibration shaft, by tilting several degrees. In this case, it is possible to support the load of the tire when configuring so as to abut this vibration shaft against the tire from below obliquely, and it is possible to efficiently transfer vibration by the vibration shaft to the tire.

EXPLANATION OF REFERENCE NUMERALS

VM variable mechanism
W wheel
W11 left front wheel
W12 right front wheel
W21 left rear wheel
W22 right rear wheel
1 vehicle vibration device
2 vehicle
3 vibrator base
4 floor
5 base
6 mobile base plate
7 front shaft
8 rear shaft
9 actuator
10 movement mechanism
11 left movement mechanism
12 right movement mechanism
13 elliptical. joint
14 hydrostatic bearing
15 vibration shaft
16 drive shaft
17 spherical joint
18 hydraulic cylinder
19 hydraulic circuit
20 controller
21 support member
22 releasing drive cylinder
23 release assist member
24 hollow part
25 shaft main body
26 axial center rod
27 left retained body part
28 disk-shaped body
29 right retained body part
30 disk-shaped part
31 spherical joint housing
32, 54 housing rear plate
33, 55 housing front plate
34a, 56a housing side plate
34b, 56b housing bottom plate
35 rear slider
36 front slider
37 rear interposed plate
38 front interposed plate
39 rear-side spherical concave-shaped retaining part
40 front-side spherical concave-shaped retaining part
41, 61 adjustable block
42, 62 adjustable block main body
43, 63 screw shaft
44, 64 pressure-regulating spring
45, 65 spring retaining part
46, 66 position retaining part
47 annular pushing part 48 adjustable nut
49 guided convex part
50 guide groove
51 guided convex part
52 guide groove
53 elliptical joint housing
57 rear retaining member
58 front retaining member
59 rear-side non-spherical concave-shaped retaining part
60 front-side non-spherical concave-shaped retaining part
67 annular pushing part
68 adjustable nut

What is claimed is:

1. A vehicle vibration device for vibrating wheels of a vehicle back and forth in a vertical direction as well as in a left/right direction by pinching in a front/rear direction each wheel of the vehicle by a front shaft and a rear shaft which extend in a left/right direction, and causing the front shaft to move back and forth in a horizontal direction, the vehicle vibration device comprising:
a variable mechanism which makes orientation of the front shaft variable, wherein the variable mechanism includes left and right movement mechanisms which are respectively connected to both left and right ends of the front shaft and are capable of moving both the left and right ends back and forth in the horizontal direction, thereby capable of causing orientation of the front shaft to vary by making movement amounts by the left and right movement mechanisms to differ thereby also capable of vibrating the wheels back and forth in the vertical direction as well as in the left/right direction.

2. The vehicle vibration device according to claim 1, further comprising a controller which controls the variable mechanism so as to reproduce a virtual travel state imitating an actual travel state of the vehicle.

3. The vehicle vibration device according to claim 2, wherein the controller controls the variable mechanism so as to establish left and right wheels in a toe-in state, so as to reproduce the virtual travel state in a case of the vehicle being a braking state.

4. The vehicle vibration device according to claim 2, wherein the controller controls the variable mechanism so as to move the vehicle in a width direction by equally varying each of the front shafts in the same direction relative to the left and right wheels so as to reproduce the virtual travel state in a case of the vehicle being a lateral slide state.

5. The vehicle vibration device according to claim 2, wherein the controller controls so as to make each of the front shafts variable in the same direction relative to front and rear wheels to reproduce the virtual travel state in a case of the vehicle being a turning state, and to tilt the front shafts relative to the front wheels greater than the front shafts relative to the rear wheels.

6. The vehicle vibration device according to claim 1, wherein one end among both left and right ends of the front shaft is connected slidably in a left/right direction with a corresponding of the movement mechanisms, and another end is connected to be non-slidable with a corresponding of the movement mechanisms.

7. The vehicle vibration device according to claim 1, wherein both left and right ends of the front shaft are connected rotatably in a horizontal direction respectively with a corresponding of the movement mechanisms.

8. The vehicle vibration device according to claim 7, wherein either end among both left and right ends of the front shaft is formed in an elliptical shape in which a major axis follows a shaft line direction of the front shaft.

* * * * *